(12) United States Patent
Hodgson et al.

(10) Patent No.: US 10,519,831 B2
(45) Date of Patent: Dec. 31, 2019

(54) DELIVERY DEVICE FOR DELIVERING A REDUCING AGENT AND MOTOR VEHICLE HAVING A DELIVERY DEVICE

(75) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 536 days.

(21) Appl. No.: 13/487,557

(22) Filed: Jun. 4, 2012

(65) Prior Publication Data

US 2012/0285147 A1   Nov. 15, 2012

Related U.S. Application Data

(63) Continuation of application No. PCT/EP2010/068815, filed on Dec. 3, 2010.

(30) Foreign Application Priority Data

Dec. 4, 2009   (DE) .................. 10 2009 057 030

(51) Int. Cl.
*F01N 3/20*   (2006.01)

(52) U.S. Cl.
CPC ........ *F01N 3/2066* (2013.01); *F01N 2610/02* (2013.01); *F01N 2610/1433* (2013.01);
(Continued)

(58) Field of Classification Search
CPC .............. F01N 3/2066; F01N 2610/02; F01N 2610/1433; F01N 2610/1446; Y02A 50/2325; Y02T 10/24
(Continued)

(56) References Cited

U.S. PATENT DOCUMENTS 2,829,909 A * 4/1958 Alessandro ........... F16L 21/022
                                                    277/626
3,596,934 A * 8/1971 De Cenzo ............... F16L 27/12
                                                    285/145.1
(Continued)

FOREIGN PATENT DOCUMENTS

DE          9304913 U1      6/1993
DE          4313447 A1  *  10/1994
(Continued)

OTHER PUBLICATIONS

Machine Translation of DE 4313447 A1.*
International Search Report of PCT/EP2010/068815, dated Feb. 17, 2011.

*Primary Examiner* — Brandon D Lee
(74) *Attorney, Agent, or Firm* — Laurence A. Greenberg; Werner H. Stemer; Ralph E. Locher

(57) ABSTRACT

A delivery device for delivering a reducing agent from a reducing agent tank to an exhaust gas treatment device of an internal combustion engine, includes a partially rigid reducing agent line and a delivery pump disposed in the reducing agent line and having a delivery direction from the reducing agent tank to the exhaust gas treatment device. The delivery device has at least one vibration compensating device selected from the following group: an inflow compensating device upstream of the delivery pump in the delivery direction, an outflow compensating device downstream of the delivery pump in the delivery direction, a pump-internal compensating device within the delivery pump, and a structure borne noise compensating device on a fixing of the delivery pump. A motor vehicle having the delivery device is also provided.

13 Claims, 4 Drawing Sheets

(52) U.S. Cl.
CPC ... *F01N 2610/1446* (2013.01); *Y02A 50/2325* (2018.01); *Y02T 10/24* (2013.01)

(58) Field of Classification Search
USPC .......... 60/286, 295; 285/223, 234, 236, 363, 285/918
See application file for complete search history.

(56) References Cited

U.S. PATENT DOCUMENTS

| | | | |
|---|---|---|---|
| 3,667,571 A * | 6/1972 | Fattelay | 181/230 |
| 3,791,680 A * | 2/1974 | Cleare | 285/148.13 |
| 3,924,409 A | 12/1975 | Heilman et al. | |
| 3,934,413 A | 1/1976 | Beiswenger et al. | |
| 5,141,259 A * | 8/1992 | Highlen | F16F 1/393 |
| | | | 285/146.3 |
| 6,154,605 A * | 11/2000 | Aonuma | 388/829 |
| 7,278,625 B2 * | 10/2007 | Huber et al. | 251/356 |
| 7,481,049 B2 * | 1/2009 | Huber et al. | 60/324 |
| 7,520,734 B2 | 4/2009 | Luedtke et al. | |
| 7,866,144 B2 | 1/2011 | Bakaj et al. | |
| 7,942,131 B2 | 5/2011 | Hoffmann et al. | |
| 8,359,831 B2 * | 1/2013 | Chmielewski | F01N 3/2066 |
| | | | 60/286 |
| 2006/0024176 A1 | 2/2006 | Ikeya | |
| 2007/0163245 A1 * | 7/2007 | Sheridan et al. | 60/286 |
| 2009/0050109 A1 | 2/2009 | Hoffmann et al. | |
| 2009/0199538 A1 * | 8/2009 | Boe et al. | 60/274 |
| 2010/0326547 A1 | 12/2010 | Haeberer et al. | |
| 2011/0072798 A1 * | 3/2011 | Herman | 60/286 |
| 2013/0323024 A1 | 12/2013 | Oota et al. | |

FOREIGN PATENT DOCUMENTS

| | | |
|---|---|---|
| DE | 10003396 A1 | 8/2001 |
| DE | 10259179 A1 | 7/2004 |
| DE | 10 2006 009 099 A1 | 8/2007 |
| DE | 10 2006 032 155 A1 | 1/2008 |
| DE | 102006061733 A1 | 7/2008 |
| FR | 2925581 A1 | 6/2009 |
| JP | 2004509277 A | 3/2004 |
| JP | 2006037870 A | 2/2006 |
| JP | 2008516150 A | 5/2008 |
| JP | 5787177 B2 | 9/2015 |
| WO | 00/79108 A1 | 12/2000 |
| WO | 2005/005799 A1 | 1/2005 |

* cited by examiner

DELIVERY DEVICE FOR DELIVERING A REDUCING AGENT AND MOTOR VEHICLE HAVING A DELIVERY DEVICE

CROSS-REFERENCE TO RELATED APPLICATION

This is a continuation, under 35 U.S.C. § 120, of copending International Application No. PCT/EP2010/068815, filed Dec. 3, 2010, which designated the United States; this application also claims the priority, under 35 U.S.C. § 119, of German Patent Application DE 10 2009 057 030.6, filed Dec. 4, 2009; the prior applications are herewith incorporated by reference in their entirety.

BACKGROUND OF THE INVENTION

Field of the Invention

The present invention relates to a delivery device for delivering a reducing agent from a reducing agent tank to an injector for feeding the reducing agent to an exhaust gas treatment device of an internal combustion engine. The invention also relates to a motor vehicle having a delivery device.

The exhaust gas from internal combustion engines generally contains substances, the emission of which into the environment is unwanted. Those substances can be removed through the use of an exhaust gas treatment device.

In the case of some methods for treating exhaust gases from an internal combustion engine in exhaust gas treatment devices, reducing agents for reducing certain pollutants in the exhaust gas are required, and they must be fed to the exhaust gas. One of those methods is Selective Catalytic Reduction (SCR). In that case, the nitrogen oxide compounds (NOx) in the exhaust gas are reduced selectively to molecular nitrogen ($N_2$) by using a reducing agent. One possible reducing agent is ammonia ($NH_3$). At the same time, ammonia is often not stored in the form of ammonia but, instead, an ammonia precursor that can be converted into ammonia when required is stored. The term "reducing agent precursor" is also used. One important reducing agent precursor which can be used in motor vehicles is urea (($NH_2$)$_2$CO). Urea is preferably stored in the form of a liquid urea/water solution. Urea and, in particular, a liquid aqueous urea solution, are harmless to health and are simple to distribute, store and meter-in in portions. An aqueous urea solution of that kind with a urea content of 32.5% is marketed under the trade name "AdBlue."

An aqueous urea solution is carried in a tank system in the motor vehicle and is metered into the exhaust system in portions through the use of an injection system including a pump and an injector. The consumption of urea for reducing unwanted nitrogen oxide compounds in the exhaust gas is up to 10% of the fuel consumption of the motor vehicle concerned. It is necessary for the reducing agent to be made available to an injector at a defined pressure for metering-in reducing agent in portions. In order to produce that pressure, a pump is generally provided in injection systems for reducing agent. Pumps which operate in a pulsed manner (in strokes) have proven particularly suitable for that purpose because they are small and inexpensive, and require little maintenance.

Generally, the problem with such delivery devices is that they produce not inconsiderable noise during operation, and the occupants of motor vehicles may sometimes find that troublesome.

SUMMARY OF THE INVENTION

It is accordingly an object of the invention to provide a delivery device for delivering a reducing agent and a motor vehicle having a delivery device, which overcome the hereinafore-mentioned disadvantages and mitigate the highlighted technical problems of the heretofore-known devices and vehicles of this general type. In particular, the intention is to disclose a delivery device which operates with particularly little noise.

With the foregoing and other objects in view there is provided, in accordance with the invention, a delivery device for delivering a reducing agent from a reducing agent tank to an exhaust gas treatment device of an internal combustion engine. The delivery device comprises a partially rigid reducing agent line, a delivery pump disposed in the reducing agent line, having a fixing and defining a delivery direction from the reducing agent tank to the exhaust gas treatment device and at least one vibration compensating device selected from the following group:
- an inflow compensating device disposed upstream of the delivery pump in the delivery direction;
- an outflow compensating device disposed downstream of the delivery pump in the delivery direction;
- a pump-internal compensating device disposed within the delivery pump; and
- a structure borne noise compensating device disposed on the fixing of the delivery pump.

The term "reducing agent" is also used herein to refer to reducing agent precursors from which reducing agent can be produced. Inflow compensating devices are provided in at least one of the following sections of the reducing agent line: upstream of the delivery pump, in the inflow line or in the feed line to the delivery pump. Outflow compensating devices are provided in at least one of the following sections of the reducing agent line: downstream of the delivery pump, in the drain line or discharge line from the delivery pump. The drain line or discharge line is also referred to as the outflow line.

In the case of the reducing agent line, it has been found that the line should be at least partially rigid. Liquid aqueous urea solution can freeze, for which reason the delivery device according to the invention should be constructed in such a way that reducing agent can freeze therein without causing damage to the delivery device and that delivery of reducing agent can be resumed quickly after the start of operation of the delivery device, even when there is frozen reducing agent in the delivery device. At least partially rigid reducing agent lines can generally be embodied with metal walls with significant wall thicknesses of above 0.5 mm. Reducing agent lines of that kind are particularly suitable for rapid introduction of heat into the frozen reducing agent contained therein, thus favoring rapid thawing.

The delivery pump of the delivery device is preferably a delivery pump which operates in a pulsed manner, in particular a piston pump or a diaphragm pump. A pump of that kind can have a working piston which is driven by an electromagnetic drive. If appropriate, the working piston can be provided with a retaining spring, and the electromagnetic drive therefore moves the working piston against the retaining spring in each working stroke, and the working piston is then moved back again by a spring force of the retaining spring. Moreover, it is also possible to use a piston-type diaphragm pump, in which a diaphragm is driven by a working piston through a transmission fluid. It has been found that the delivery pump of the delivery device is the principal source of the noise emitted by the delivery device, especially when it is interacting with rigid reducing agent lines. In pumps which operate in a pulsed manner, a delivery piston is normally moved backward and forward, e.g. a diaphragm-type delivery pump. In that case, the delivery piston has to be accelerated and braked at regular intervals. There is a shock which, on one hand, is transmitted as structure borne noise through the body of the delivery pump and, on the other hand, can also be detected as a flow pulse in the reducing agent line and passes out of the delivery pump, especially if acceleration or braking is sudden, because the delivery piston strikes against a stop, for example.

Within the context of the delivery device according to the invention, noise transmitted by a delivery pump can be compensated for in at least one of the four different ways. An inflow compensating device and/or an outflow compensating device in the reducing agent line can mitigate or compensate for flow pulses in the (rigid) reducing agent line and, at the same time, prevent or reduce the transmission of structure borne noise through the wall of the reducing agent line. Transmission of structure borne noise through the fixing of the pump can furthermore be prevented or reduced by suitable structure borne noise compensating devices on the fixing of the delivery pump. Moreover, it is also possible to provide pump-internal compensating devices within the delivery pump. Such compensating devices keep the noise which arises in the pump at a low level from the outset. Such "mufflers" can also be provided in the form of orifice plates or the like, through which there is a flow, and/or in the form of changes in the flow cross section of the line, for example, and these elements can also be combined and/or several such elements can be provided, if appropriate.

In the case of inflow compensating devices and/or outflow compensating devices, it must be taken into account that much more compensation of noise transmission due to a flow pulse is required in the reducing agent line downstream of the delivery pump than upstream of the delivery pump in the direction of delivery. This is because the flow pulse of the delivery pump is significant only in the delivery direction. Although it is also possible that a corresponding pressure surge will occur on the intake side, upstream of the delivery pump in the direction of flow, this is normally considerably smaller than the pressure surge output by the delivery pump.

Within the context of the invention, it is therefore particularly advantageous to dimension the outflow compensating devices provided in such a way that they have a volume which is at least 2 times as large, preferably 5 times as large and, in particular, at least 10 times as large as the volume of any inflow compensating devices present. In many applications, it may also be worthwhile to dispense with inflow compensating devices entirely and/or to dimension the outflow compensating devices in such a way that they are at least 20 times, preferably at least 50 times, as large as the corresponding inflow compensating devices.

In accordance with another feature of the invention, the delivery device is particularly advantageous if it has at least one element from the following group:
 a metal base plate, in which the reducing agent line is at least partially formed and on which the delivery pump is fixed, and
 a metal housing.

In general, metal components within the delivery device are particularly suitable for transmitting heat, and metal components thus make it possible to achieve a considerable improvement in the thawing behavior when the delivery device is put into operation in the frozen state. However, metal components are also particularly good noise transmitters. This is due especially to the high modulus of elasticity of such metal components. For this reason, the provision of suitable compensating devices in a delivery device having corresponding metal components is particularly advantageous.

In accordance with a further feature of the invention, the delivery device is also particularly advantageous if the at least one inflow compensating device includes at least one element from the following group:
 an O-ring seal in the reducing agent line,
 a bellows filled with reducing agent,
 a bellows filled with air, and
 a flexible reducing agent line section in the rigid reducing agent line.

Through the use of an O-ring seal in the reducing agent line, it is possible to achieve a fluid tight interruption in the reducing agent line, particularly in the case of a rigid metal reducing agent line. As an alternative or in addition to an O-ring seal, it is also possible to provide a sleeve made of a flexible material, e.g. rubber, as an inflow compensating device. This sleeve can be provided either as an interruption in the rigid reducing agent line and/or as an inserted element within a continuous rigid reducing agent line. It is also possible for a rigid reducing agent line to have an internal rubber-coated surface (in sections) as a compensating element. An interruption of this kind makes it more difficult for structure borne noise to be transmitted by the wall of the reducing agent line. A bellows filled with reducing agent can be embodied as a component part of the reducing agent line. For example, the wall of the reducing agent line can contain an integral bellows of this kind through having a corresponding outward deformation. The important point in the case of a bellows of this kind is that the volume filled with reducing agent is flexible. Thinning the wall of the reducing agent line relative to the rest of the reducing agent line is thus one possibility. Another possibility is to produce the reducing agent line from a more flexible material in the area of the bellows than in the other areas. The use of a bellows filled with air is also possible. A bellows of this kind should be formed directly adjoining the reducing agent line, allowing it to be compressed when there is a pressure surge within the reducing agent line, in order to absorb the effects of the pressure surge in this way. Both in the case of the bellows filled with reducing agent and that filled with air, compensation of structure borne noise which is transmitted is also due to the fact that the walls are particularly thin in the area of the bellows, thus ensuring that structure borne noise can be transmitted only to a reduced extent. In the case of a bellows filled with air or with some other compressible medium, it is possible to set the damping effect of the bellows precisely by way of the air pressure in the bellows. For example, the damping effect can be set so that noise compensation takes place below a certain sound level. A bellows can also be provided with a spring which supports it against a rigid surface, for example. In this way, it is possible to influence the behavior of the bellows.

Moreover, it is also possible to provide a flexible reducing agent line section within the partially rigid reducing agent line. Admittedly, a flexible reducing agent section of this kind conflicts at least partially with the general structural concept of the delivery device according to the invention having rigid reducing agent lines. However, a (small) flexible reducing agent line section of this kind in some areas of the delivery pump makes it possible to achieve particularly effective compensation of the transmission of structure borne noise from the delivery pump to the rest of the delivery device. In general, it is precisely in this area that the use of a flexible reducing agent line section is particularly simple to implement because a releasable connection between the delivery pump and the rest of the delivery device is intended in any case. It is also possible to place the flexible reducing agent line section in such a way that it is in direct contact with a metal wall, in particular a wall of a metal housing, thus allowing effective introduction of heat into the flexible reducing agent line section.

In accordance with an added feature of the invention, the delivery device also corresponds to the invention if the at least one outflow compensating device includes at least one element from the following group:
  an O-ring seal in the reducing agent line,
  a bellows filled with reducing agent,
  a bellows filled with air,
  a flow constriction,
  a flow deflection,
  a surface which produces interference, and
  a flexible reducing agent line section in the rigid reducing agent line.

In the outflow from the delivery device, downstream of the delivery pump in the delivery direction, compensation of the flow pulse in the reducing agent, in particular, is generally especially important for compensating the transmission of noise from the delivery pump to the rest of the delivery device.

The general modes of operation of an O-ring seal in the reducing agent line, of a bellows filled with reducing agent, of a bellows filled with air and of a flexible reducing agent line section in the partially rigid reducing agent line, have already been explained in the context of the explanations relating to the inflow compensating device. These explanations are incorporated in full by reference herein. The embodiments of the inflow compensating device and modifications of this device which have been presented are also incorporated fully by reference herein and can also be applied and transferred to the outflow compensating device.

In addition, it is also possible for a flow constriction to be provided as an outflow compensating device. A flow constriction of this kind represents a flow resistance, through the use of which a flow pulse in the reducing agent line is at least partially compensated. A flow constriction also produces damping of the delivery piston of a delivery pump because only a limited quantity of reducing agent can flow through an appropriate flow constriction and, as a result, the delivery rate of the delivery pump is reduced. A flow deflection also acts in a similar way, and it is thereby additionally possible to achieve swirling within the reducing agent flow, which can lead at least partially to a reduction in the pressure surge. It is furthermore also possible to provide a surface which produces interference, through the use of which corresponding deflection and swirling flows in the reducing agent are produced, which likewise bringing about a reduction in the pressure surge. In order to produce interference, the outflow line can also be shaped like a screw. A screw is particularly suitable for producing interference in the reducing agent flow emerging from the delivery pump. The screw can be shaped in such a way that sound waves die out therein.

In the reducing agent line, a flow pulse is also at least partially converted into structure borne noise at the wall. Due to this conversion, it is particularly advantageous to provide a compensating device which is particularly suitable for compensating flow pulses and a compensating device which is particularly suitable for compensating structure borne noise as outflow compensating device. Bellows filled with reducing agent and/or air or flow constrictions or flow deflections are particularly suitable for compensating the flow pulse. The transmission of structure borne noise through a reducing agent line can be achieved in a particularly effective manner through a mechanical division of the reducing agent line. An O-ring seal is particularly suitable in this case. It is therefore particularly advantageous to provide an O-ring seal in combination with a bellows filled with air or reducing agent or a flow constriction or a flow deflection as an outflow compensating device. In this case, the compensating device for compensating the flow pulse should be provided first in the direction of flow in order to prevent uncontrolled transmission of the noise as a flow pulse. The compensating device for compensating the structure borne noise should then be provided in order to prevent transmission of the structure borne noise in an effective manner as well.

In order to obtain an inflow compensating device or an outflow compensating device, the inflow line or the outflow line can be manufactured from plastic. A rubber hose can be used as an inflow line and/or as an outflow line, for example. Multilayer inflow lines and outflow lines are also particularly advantageous. The properties of such lines and, in particular, the flexibility and thermal conductivity thereof can be adjusted in a particularly well-targeted way in the case of multilayer lines. If the inflow line and/or the outflow line is manufactured from plastic, metallic woven fabric or metal strips can be incorporated into this plastic. It is also possible to embody the inflow line and/or the outflow line with a phase change material.

If the delivery device has a metal base plate, it may be necessary to attach the inflow line and/or the outflow line to the metal base plate (releasably/permanently). This attachment must establish a sufficiently pressure tight fluid connection between the metal base plate and the inflow line and/or outflow line.

The attachment of the inflow line and/or of the outflow line to a base plate of the delivery device can be accomplished with the aid of a flexible adhesive. Attachment can furthermore be accomplished by a material bond, e.g. by welding. It is also possible to embody the fixing with the aid of a hose clamp. This is advantageous particularly if the inflow line and/or the outflow line includes a rubber hose. For attaching the inflow line and/or the outflow line, it is also possible to use a (cylindrical) plastic sleeve or rubber sleeve, which is inserted as an intermediate piece for sealing between the inflow line and/or the outflow line and the base plate. The plastic sleeve can be constructed in such a way that it forms a plurality of annular sealing surfaces with the base plate and/or the inflow line or the outflow line. The plastic sleeve preferably has on the outer surface and/or on the inner surface thereof a plurality of encircling bead-type elevations, which form sealing surfaces. It is furthermore also possible for the plastic sleeve to have an even surface, at least in some areas, and for annular encircling elevations, which form the sealing surfaces together with the even surface, to be provided on the inflow line, the outflow line or the base plate for sealing with the plastic sleeve.

In accordance with an additional feature of the invention, the delivery device is also preferred if the at least one pump-internal compensating device provided within the delivery pump has at least one element from the following group:
  a flexible stop,
  a throttled stop, and
  an elastic transmission fluid.

Providing a pump-internal compensating device within the delivery pump is particularly effective because in this way noise can be minimized or prevented directly at the source thereof. By reducing the flow pulse triggered by the delivery pump, it is also possible to prevent the flow pulse from producing structure borne noise in other areas of the delivery device.

As already explained, a delivery pump operating in a pulsed manner generally has a reciprocating delivery piston. This delivery piston acts either directly on the fluid to be delivered or is separated from the fluid by a diaphragm. In most cases, a transmission fluid is then provided, which transmits the forces of the delivery piston in a particularly gentle manner to the diaphragm. In this way, it is possible to prevent contact between the fluid to be delivered, in this case reducing agent, and the mechanism of the delivery pump. This is advantageous particularly because, as a general rule, reducing agent has a particularly corrosive effect, and the mechanism of the delivery pump could be damaged by contact with reducing agent. External spring elements and/or damper elements can also be provided. Those elements influence, in particular reduce or even prevent, a movement/vibration etc. of the (entire) pump relative to the lines.

The sudden braking of the delivery piston after carrying out a delivery movement is particularly problematic for the generation of structure borne noise and the pressure surge. That can be prevented at least partially through the use of a flexible stop, for example, which yields when the delivery piston strikes. It is furthermore also possible to provide a throttled stop, in which a quantity of fluid has to be passed through a narrowed passage shortly before the conclusion of the delivery stroke, giving rise to a significant flow resistance which brakes the delivery piston. Moreover, it is also possible to provide an elastic delivery fluid. The braking of the delivery piston does then admittedly take place abruptly, but the transmission fluid is compressed by the movement of the delivery piston and expands with a time delay, thus ensuring that no particular pressure surge is produced in the reducing agent to be delivered.

The measures proposed herein can also form a development of a pump independently of the delivery device.

In accordance with yet another feature of the invention, the delivery device is also in accordance with the invention if the at least one structure borne noise compensating device is present on a fixing of the delivery pump and includes at least one element from the following group:
 a flexible fixing of the delivery pump,
 a cross-sectional reduction on the fixing of the delivery pump, and
 a flexible mounting of a base plate on which the delivery pump is fixed.

Through the use of a flexible fixing of the delivery pump, transmission of structure borne noise from the delivery pump to the component on which the delivery pump is fixed, typically the base plate of a delivery device, can be reduced or prevented. It is advantageous to embody such a flexible fixing of the delivery pump from a different material than the delivery pump and the base plate. For example, the flexible fixing can be formed by a block of plastic, in which case a suitable thermal bridge from the delivery pump to the metal base plate can then additionally be provided. A cross-sectional reduction on the fixing of the delivery pump reduces the cross section available for the transmission of structure borne noise from the delivery pump to the corresponding component to which the delivery pump is fixed. This too prevents or reduces the transmission of structure borne noise.

It is also possible to fix the component to which the delivery pump is fixed, in particular a base plate, to a flexible mounting. If a flexible fixing of the delivery pump and/or a corresponding cross-sectional reduction is additionally provided on the fixing of the delivery pump, the metal base plate acts like an additional damping element, to which oscillations opposed to those of the delivery pump are imparted and which thus compensates in an effective manner for the movement of the delivery pump. In this way, it is possible to prevent transmission of structure borne noise beyond the base plate in an effective manner.

In addition and/or as an alternative to the compensation measures described, it is also possible to implement structure borne noise and noise transmission from a delivery device with the aid of compensation measures based on feedback control or a methodological approach. In particular, the intention is to indicate in this case a method for operating a delivery device for delivering a reducing agent from a reducing agent tank to an exhaust gas treatment device of an internal combustion engine, the device comprising a partially rigid reducing agent line and a delivery pump which is disposed in the reducing agent line and has a delivery direction, including at least one of the following steps:
 absorption of pressure peaks,
 gentle braking of a delivery piston of the delivery pump, and
 gentle acceleration of a delivery piston of the delivery pump.

As already explained in connection with the delivery device according to the invention, the noise produced by the delivery device is connected substantially with the flow pulse which arises from the delivery movement and with the associated pressure peaks.

Within the context of the method described, it is possible to cap precisely these pressure peaks. Delivery devices for reducing agent generally have a return valve, through which the reducing agent being delivered can pass back into the reducing agent tank from the delivery device. For this purpose, return valves of this kind are generally disposed downstream of the delivery pump in the delivery direction and can be set up in such a way that they open at a certain threshold above 8 bar, in particular above 10 bar and particularly preferably above 12 bar, in such a way that the pressure peak is capped.

Gentle (reduced) braking of a delivery piston of the delivery pump or gentle (reduced) acceleration of a delivery piston of the delivery pump can furthermore also take place. This can be achieved, in particular, by measures based on feedback control. For example, the current for operating an electromagnetic drive of the delivery piston can be respectively increased and reduced (continuously) to brake and accelerate the delivery piston so that the delivery piston is in each case braked or accelerated gently. It is likewise possible for the polarity of the (electromagnetic) drive to be reversed (locally and/or for a limited time) in order to achieve a rapid effect on the delivery piston. It is also possible to provide an additional coil, which can brake the delivery piston.

Active compensation of noise is also possible. It is possible to provide noise canceling loudspeakers in the delivery device, for example. For this purpose, it is also possible to use loudspeakers which operate in the ultrasound range.

With the objects of the invention in view, there is concomitantly provided a motor vehicle, comprising an internal combustion engine, an exhaust system having at least one exhaust gas treatment device configured for selective catalytic reduction, and a delivery device according to the invention.

A motor vehicle comprising the delivery device configured to carry out a method according to the invention is also in accordance with the invention.

The advantages and special embodiments which have been explained in connection with the delivery device according to the invention can be applied and transferred analogously to the method described herein. Advantages and special features and embodiments of the method can likewise be transferred to the delivery device according to the invention.

Other features which are considered as characteristic for the invention are set forth in the appended claims, noting that the features presented individually in the claims can be combined in any technologically meaningful way and can be supplemented by explanatory material from the description, giving rise to additional variant embodiments of the invention.

Although the invention is illustrated and described herein as embodied in a delivery device for delivering a reducing agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
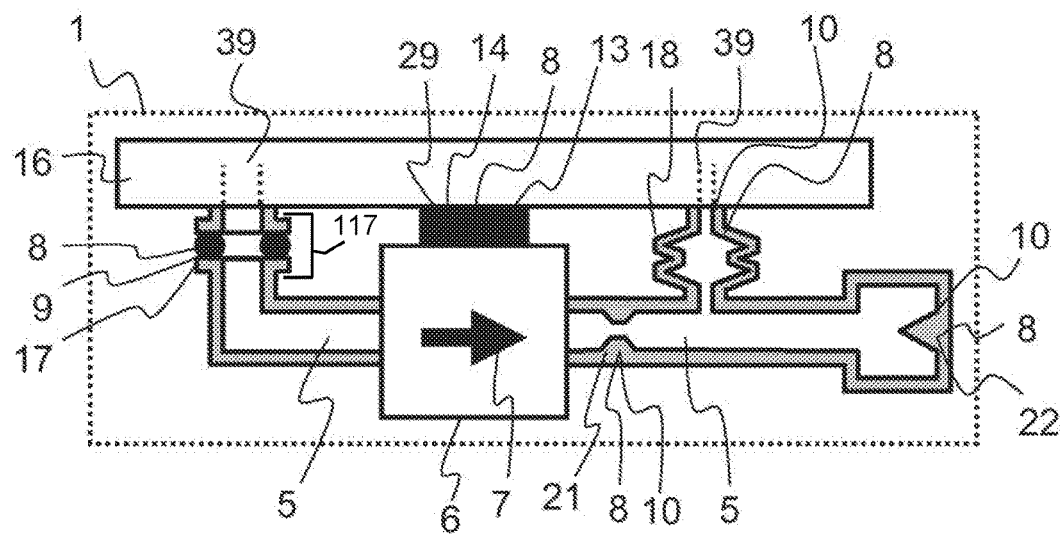
FIG. 1 is a diagrammatic, longitudinal-sectional view of a first variant embodiment of a delivery device according to the invention.
Figure 2:
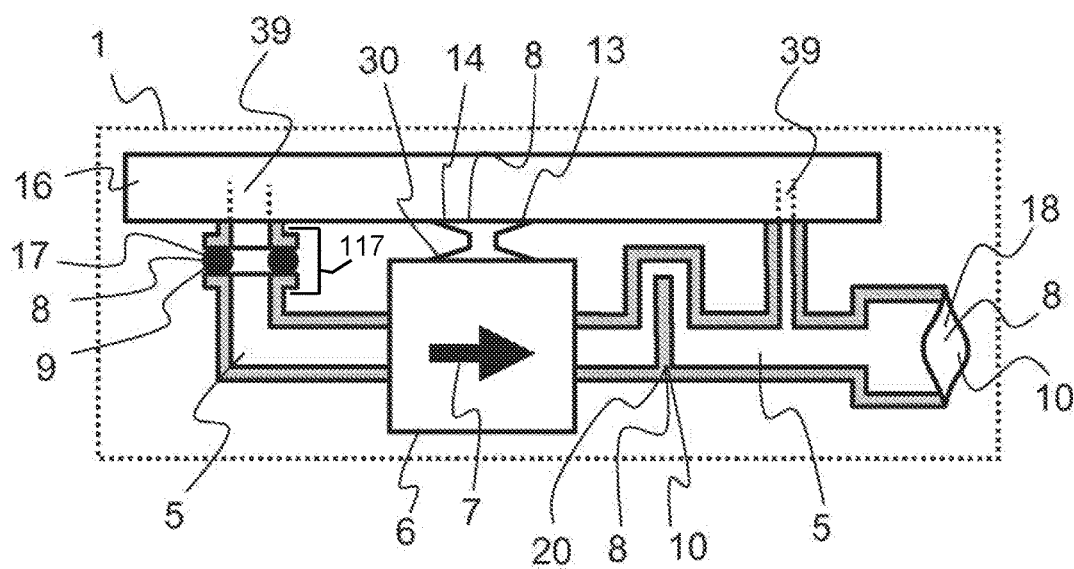
FIG. 2 is a longitudinal-sectional view of a second variant embodiment of a delivery device according to the invention.

Referring now in detail to the figures of the drawing for explaining the invention and the technical field in more detail by showing particularly preferred structural variants to which the invention is not restricted and in which proportions are only diagrammatically shown, and first, particularly, to FIGS. 1 and 2 thereof, there are seen first and second variant embodiments of a delivery device 1 according to the invention. The delivery device 1 according to the invention includes a metal base plate 16 and a delivery pump 6. The delivery pump 6 is connected to the metal base plate 16 by a reducing agent line 5. At least one duct 39, through which the reducing agent can be passed on to other components of the delivery device 1 which are not shown therein, is provided in the metal base plate 16. The reducing agent is delivered by the delivery pump 6 and the reducing agent line 5 in a delivery direction 7.

According to FIGS. 1 and 2, various vibration compensating devices 8 are provided and explained in detail below.

In FIG. 1, an inflow compensating device 9 is provided, which is embodied as an O-ring seal 17 in the reducing agent line 5. A diagrammatically shown connector 117 secures the O-ring 17 in the reducing agent line 5. An outflow compensating device 10 is furthermore provided, which is embodied as a bellows 18 filled with reducing agent. In this case, a simple corrugation of a wall of the reducing agent line 5 is shown, through the use of which expansion of the reducing agent volume in the reducing agent line 5 is possible. Moreover, a surface 22 which produces interference is provided as an outflow compensating device 10. By way of example, this interference-producing surface 22 can be embodied as a pyramid which is aligned counter to the delivery direction 7 and which causes the formation of a backward wave in the reducing agent flow, producing at least partial extinction of a pressure pulse in the reducing agent flow. Moreover, a flow constriction 21 is provided as an outflow compensating device 10, the action of which has already been explained in detail. Finally, a structure borne noise compensating device 13 is also provided to prevent the transmission of structure borne noise from the delivery pump 6 toward the metal base plate 16. This structure borne noise compensating device 13 is embodied as a flexible fixing or attachment 29 within a fixing or attachment 14 of the delivery pump 6. Further explanatory statements have already been made with respect to this feature as well.

According to FIG. 2, an O-ring seal 17 is likewise shown as an inflow compensating device 9. A bellows 18 which is filled with air is provided as an outflow compensating device 10. This bellows 18 can be compressed when a flow pulse from the delivery pump 6 occurs and thus leads to an elastic change in the volume within the reducing agent line 5. The flexible bellows 18 is delimited from the reducing agent by a diaphragm. In addition, a flow deflection 20 is provided as an outflow compensating device 10, and the action thereof has likewise already been explained in detail. In this case, a cross-sectional reduction 30 is provided as a structure borne noise compensating device 13 in the region of the fixing 14 of the delivery pump 6 on the metal base plate 16.

Figure 3:
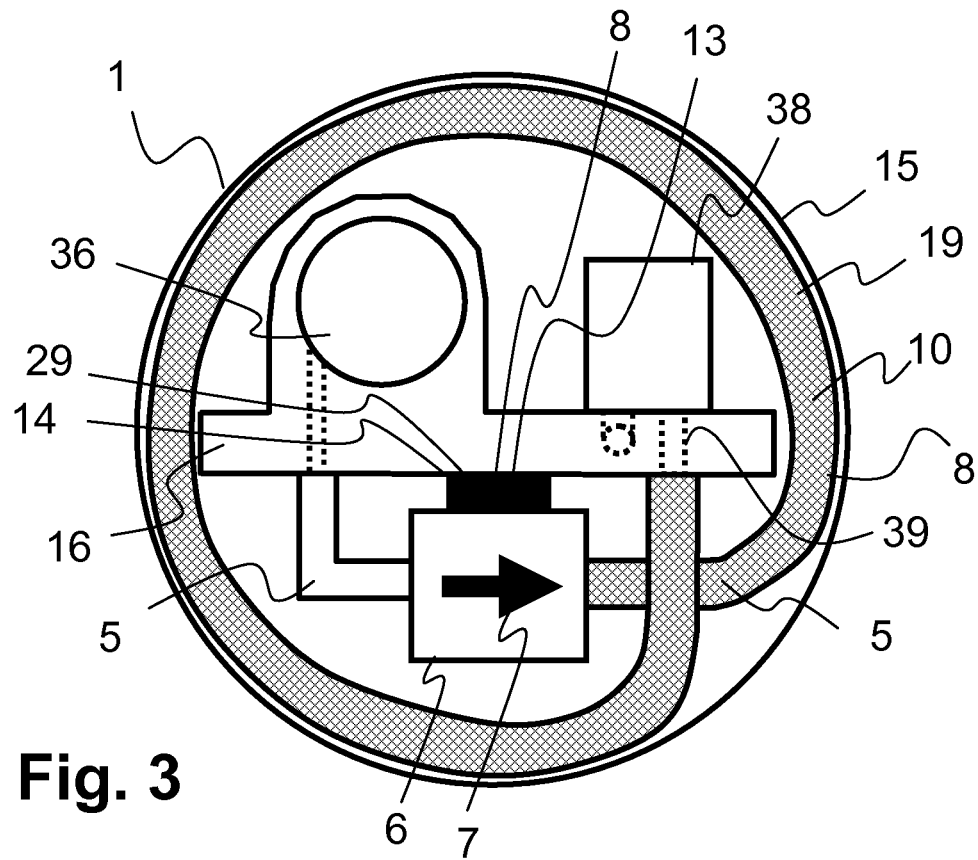
FIG. 3 is a top-plan view of a third variant embodiment of a delivery device according to the invention.

FIG. 3 illustrates a third variant embodiment of a delivery device 1 according to the invention and likewise shows a metal base plate 16 on which a delivery pump 6 is fixed and furthermore a metal housing 15 of the delivery device 1. The delivery pump 6 is attached to the metal base plate 16 through reducing agent lines 5. Reducing agent is delivered by the delivery pump 6 and the reducing agent line 5 in a delivery direction 7. The reducing agent is distributed to further components of the delivery device 1 through ducts 39 within the metal base plate 16. A filter 36 and a return valve 38 are shown in this case as further components. In the variant embodiment according to FIG. 3, an outflow compensating device 10, embodied as a flexible reducing agent line section 19, is provided as a vibration compensating device 8. This flexible reducing agent line section 19 is passed once completely around and along the metal housing 15 of the delivery device 1. On one hand, this enables the flexible reducing agent line section 19 to be positioned in a particularly space-saving way. On the other hand, a relatively long flexible reducing agent line section 19 can be provided. The flexible reducing agent line section 19 also rests against the metal housing 15, ensuring that good heat transfer is possible in this case. On one hand, the length and circular routing of the flexible reducing agent line section 19 ensures particularly good compensation of a pressure pulse. At the same time, such a long flexible reducing agent line section 19 also represents a flexible volume for reducing agent, the action of which is similar to that of a bellows. A structure borne noise compensating device 13 is furthermore provided as a vibration compensating device 8 in the region of the fixing 14 of the delivery pump 6 on the metal base plate 16. This structure borne noise compensating device 13 is embodied as a flexible fixing 29.

Figure 4:
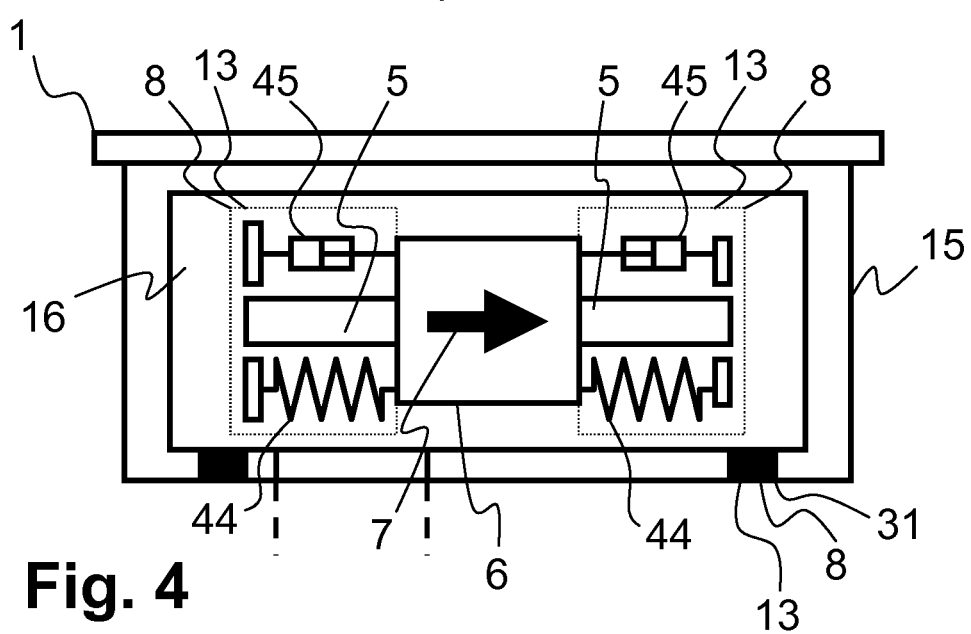
FIG. 4 is a fragmentary, side-elevational view of a fourth variant embodiment of a delivery device according to the invention.

FIG. 4 shows a fragmentary side view of a delivery device 1 according to the invention. In this case too, the metal housing 15 and the metal base plate 16 can be seen. The delivery pump 6 with the reducing agent lines 5, through which reducing agent can be delivered in the delivery direction 7, can be seen on the metal base plate 16. According to FIG. 4, only one structure borne noise compensating device 13 is provided as a vibration compensating device 8. That device 13 is embodied as a flexible mounting 31 of the metal base plate 16 in the metal housing 15. Structure borne noise compensating devices 13 in the form of a vibration compensating device 8 are furthermore shown in FIG. 4. These structure borne noise compensating devices 13 are a system of springs 44 and dampers 45, through the use of which the delivery pump 6 is fixed on the metal base plate 16. A structure borne noise compensating device 13 of this kind is formed of at least one spring 44 and at least one damper 45. Through an appropriate choice of spring constant for the springs 44 and of damping constant for the dampers 45, the structure borne noise compensating device 13 can be set in such a way that it provides particularly good compensation of individual vibration frequencies and/or of entire vibration frequency ranges produced by the delivery pump.

Figure 5:
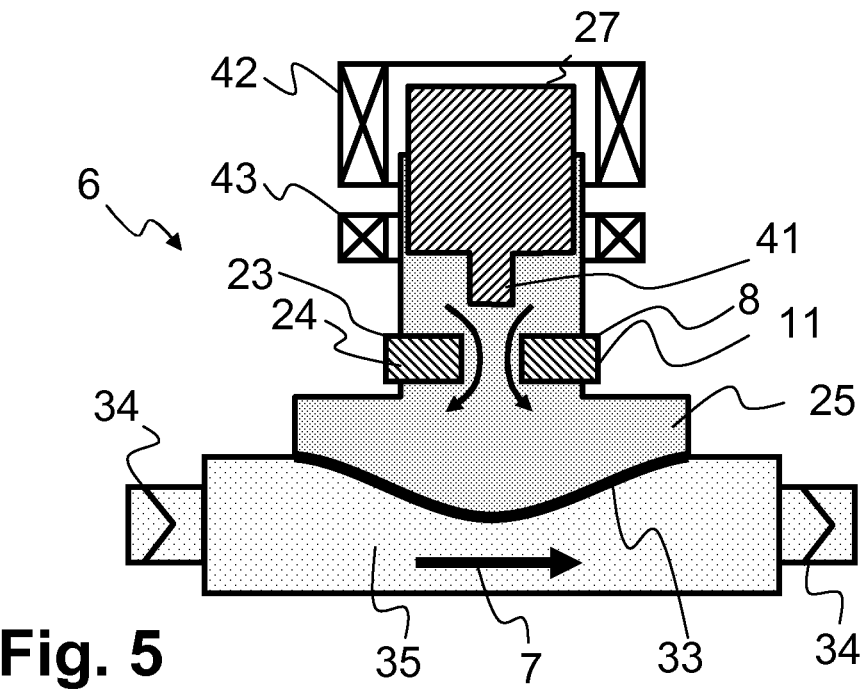
FIG. 5 is an enlarged, sectional view of a portion of a delivery pump for a delivery device according to the invention.

FIG. 5 shows a detail of a delivery pump 6. The delivery pump 6 operates in a pulsed manner. It has a pump chamber 35, through which reducing agent can be delivered in a delivery direction 7. The delivery direction 7 is determined by two valves 34. The volume of the pump chamber 35 is increased and reduced by a diaphragm 33 at regular intervals. A force produced by a delivery piston 27 is transmitted to the diaphragm by a transmission fluid 25. The delivery piston 27 is driven by a drive 42. A drive 42 of this kind has an electromagnetic drive with a coil. The transmission fluid 25 can be elastic in order to reduce the flow pulse triggered by the delivery piston 27. A vibration compensating device 8 is provided as a flexible stop 23 which can be provided as a pump-internal compensating device 11. As an alternative or at the same time, the flexible stop 23 can be a throttled stop 24. If the delivery piston 27 moves into an end position thereof against the flexible stop 23 or against the flexible stop 24, it is slowly braked either by elastic deflection of the flexible stop 23 or by a throttling action by the throttled stop 24 on the transmission fluid 25, with the result that no noise-generating flow pulse arises. A projection 41 can be provided on the delivery piston 27 of a delivery pump 6 in order to promote a throttling effect of the throttled stop 24. The projection 41 promotes the throttling effect because there is a narrow gap between the throttled stop 24 and the projection 41 just before the conclusion of a delivery stroke of the delivery piston 27. As an option, it is also possible, for example, to provide a braking coil 43, which can exert an electromagnetic counterpulse on the delivery piston 27, with the result that the delivery piston 27 is not braked suddenly but in a damped manner. It is also possible for the polarity of the drive 42 to be reversed in order to brake the delivery piston 27 and consequently for the drive 42 itself to exert a counterpulse on the delivery piston 27 in order to brake the latter.

Figure 6:
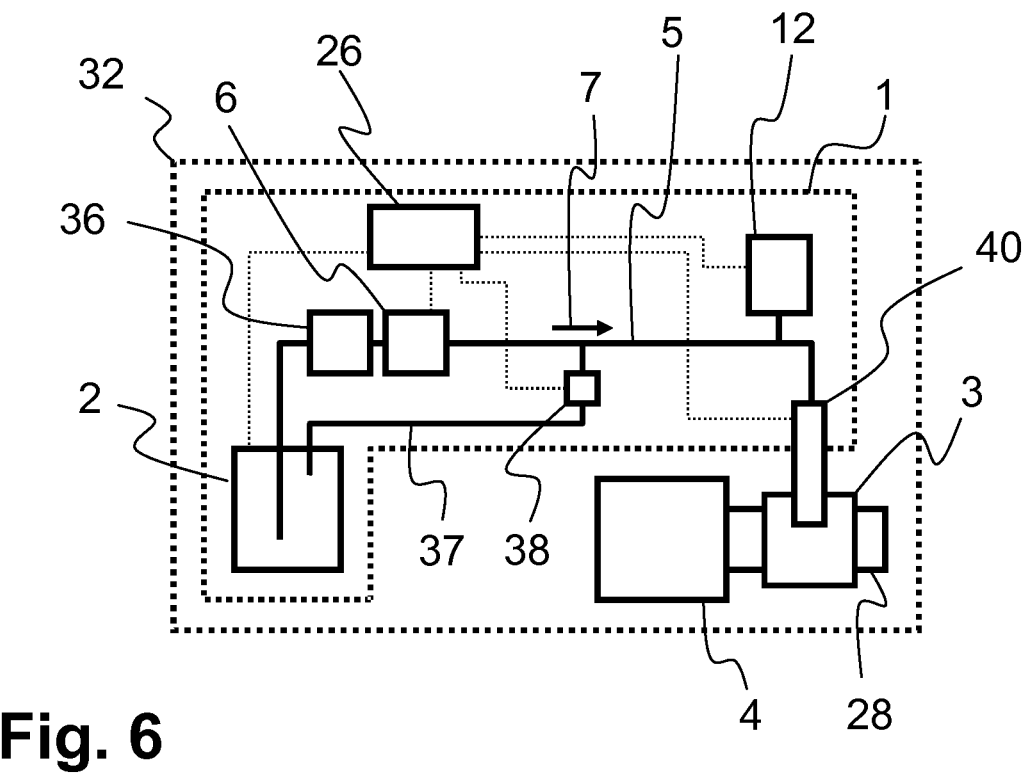
FIG. 6 is a plan view of a motor vehicle including a delivery device according to the invention.

FIG. 6 shows a motor vehicle 32 having an internal combustion engine 4, an exhaust gas treatment device 3 and a delivery device 1 according to the invention. The exhaust gas treatment device 3 is disposed within an exhaust system 28 of the internal combustion engine 4. The delivery device 1 delivers reducing agent in a delivery direction 7, from a reducing agent tank 2 to an injector 40, through which the reducing agent is introduced into the exhaust system 28 or exhaust gas treatment device 3. The delivery device 1 has a filter 36, a delivery pump 6 and a pressure sensor 12 along a reducing agent line 5.

A return line 37 leading back into the reducing agent tank 2 is furthermore provided in the reducing agent line 5 downstream of the delivery pump 6 in the delivery direction 7. Excess reducing agent can be returned to the reducing agent tank 2 through the return line 37. The return line 37 has a return valve 38, through which a flow pulse in the reducing agent in the reducing agent line 5 can be absorbed. Such a flow pulse can arise spontaneously from mechanical opening when there is excess pressure on the return valve 38. However, it is also possible to determine such a flow pulse through the use of the pressure sensor 12 and to open the return valve 38 accordingly. The processes in the delivery device 1 can be controlled by a controller 26, which is connected to the significant components of the delivery device 1. The procedures described for compensating noise and flow pulses within the delivery device 1 can also be implemented within a controller 26 of this kind.

Figure 7:
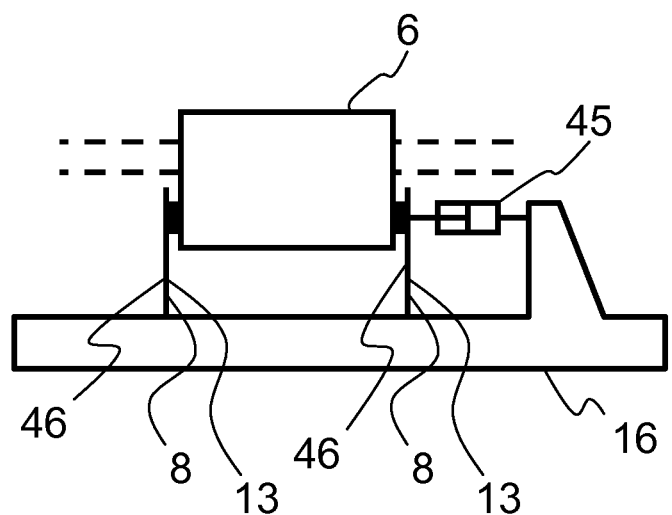
FIG. 7 is a side-elevational view of a variant embodiment of a structure borne noise compensating device.

FIG. 7 shows another vibration compensating device 8, which is embodied as a structure borne noise compensating device 13. The delivery pump 6 is fixed on the metal base plate 16 with the aid of spring plates 46 disposed vertically on the metal base plate 16. A damper 45 is provided in addition. The spring plates 46 have a spring constant and the damper 45 has a damping constant. The system can be set precisely for compensating certain vibration frequencies or even vibration frequency ranges produced by the delivery pump 6, through an appropriate choice of those constants.

The invention claimed is:

1. A delivery device for delivering a reducing agent from a reducing agent tank to an exhaust gas treatment device of an internal combustion engine, the delivery device comprising:
 a rigid metal reducing agent line having a rigid metal wall;
 a delivery pump which operates in a pulsed manner disposed in said reducing agent line, having a fixing and defining a delivery direction from the reducing agent tank to the exhaust gas treatment device; and
 at least one vibration compensating device being an inflow compensating device disposed upstream of said delivery pump in said delivery direction, said inflow compensating device including an O-ring seal in said rigid metal reducing agent line, said O-ring seal interrupting said rigid metal reducing agent line for reducing a transmission of structure borne noise via said rigid metal wall of said rigid metal reducing agent line.

2. The delivery device according to claim 1, which further comprises at least one element selected from the following group:
 a metal base plate in which said rigid metal reducing agent line is at least partially formed and on which said delivery pump is fixed; and
 a metal housing.

3. The delivery device according to claim 1, further comprising:
a further inflow compensating device disposed upstream of said delivery pump in said delivery direction for reducing a transmission of structure borne noise via said rigid metal wall of said rigid metal reducing agent line, said further inflow compensating device including a bellows filled with reducing agent.

4. The delivery device according to claim 1, wherein the reducing agent at least partially flows on an inside diameter surface of said O-ring seal.

5. The delivery device according to claim 1, wherein said rigid metal reducing agent line has, in sections, an internal rubber-coated surface as an additional inflow compensator.

6. The delivery device according to claim 1, wherein said O-ring seal divides said rigid metal reducing agent line into a first line section and a second line section of said rigid metal reducing agent line, said first line section and said second line section are separated from each other by said O-ring seal.

7. The delivery device according to claim 1, wherein as an additional vibration compensator there is provided an outflow compensating device disposed downstream of said delivery pump in said delivery direction so as to reduce a transmission of structure borne noise via the rigid metal wall of the rigid metal reducing agent line, said outflow compensator includes a surface producing interference through which deflection and swirling flows in said reducing agent are created to reduce a pressure surge output by said delivery pump.

8. The delivery device according to claim 1, wherein as an additional vibration compensating device there is provided a pump-internal compensator within said delivery pump, said pump-internal compensator includes a flexible stop which yields when a delivery piston of said delivery pump strikes against said flexible stop.

9. The delivery device according to claim 1, wherein as an additional vibration compensator there is provided a structure borne noise compensator on said fixing of said delivery pump, said structure borne noise compensator includes a flexible fixing of said delivery pump.

10. The delivery device according to claim 6, wherein said O-ring seal is in direct contact with said first line section and said second line section.

11. The delivery device according to claim 6, wherein said O-ring seal is disposed between said first line section and said second line section in a direction of flow of reducing agent within said reducing agent line.

12. The delivery device according to claim 6, wherein said O-ring seal defines an axial extent of said reducing agent line between said first line section and said second line section.

13. A motor vehicle, comprising:
an internal combustion engine;
an exhaust system having at least one exhaust gas treatment device associated with said internal combustion engine and configured for selective catalytic reduction; and
a delivery device according to claim 1 associated with said at least one exhaust gas treatment device.

* * * * *